United States Patent
Storm

(10) Patent No.: US 9,125,281 B2
(45) Date of Patent: Sep. 1, 2015

(54) METHOD FOR CONTROLLING A VOLTAGE TRANSFORMER FOR OVERVOLTAGE PROTECTION, VOLTAGE TRANSFORMER AND OPERATING DEVICE HAVING A VOLTAGE TRANSFORMER

(75) Inventor: Arwed Storm, Dachau (DE)

(73) Assignee: OSRAM Gesellschaft mit beschrankter Haftung, Munich (DE)

( * ) Notice: Subject to any disclaimer, the term of this patent is extended or adjusted under 35 U.S.C. 154(b) by 842 days.

(21) Appl. No.: 13/390,011

(22) PCT Filed: Jul. 23, 2010

(86) PCT No.: PCT/EP2010/060721
§ 371 (c)(1),
(2), (4) Date: Feb. 10, 2012

(87) PCT Pub. No.: WO2011/018324
PCT Pub. Date: Feb. 17, 2011

(65) Prior Publication Data
US 2012/0139435 A1   Jun. 7, 2012

(30) Foreign Application Priority Data
Aug. 10, 2009  (DE) .......................... 10 2009 036 861

(51) Int. Cl.
| H05B 41/36 | (2006.01) |
| H05B 41/285 | (2006.01) |
| H02M 1/42 | (2007.01) |
| H05B 41/28 | (2006.01) |
| H02M 3/158 | (2006.01) |
| H02M 1/32 | (2007.01) |

(52) U.S. Cl.
CPC ......... *H05B 41/2853* (2013.01); *H02M 1/4225* (2013.01); *H02M 3/158* (2013.01); *H05B 41/28* (2013.01); *H02M 1/32* (2013.01); *Y02B 70/126* (2013.01)

(58) Field of Classification Search
USPC .................. 315/219, 223, 224; 363/50, 52, 53
See application file for complete search history.

(56) References Cited

U.S. PATENT DOCUMENTS

| 5,892,672 | A  * | 4/1999 | Preller ............................ 363/97 |
| 6,833,678 | B2 | 12/2004 | Mayer et al. |
| 7,196,479 | B2 | 3/2007 | Storm |
| 8,270,138 | B2 * | 9/2012 | Takahashi et al. ............ 361/101 |

FOREIGN PATENT DOCUMENTS

| CN | 101061345 | 10/2007 |
| DE | 10348210 | 5/2005 |
| EP | 1397029 | 3/2004 |
| EP | 1526622 A2 | 4/2005 |

* cited by examiner

*Primary Examiner* — William Hernandez
(74) *Attorney, Agent, or Firm* — Cozen O'Connor

(57) ABSTRACT

A method for controlling a voltage transformer for operating a switchable load having at least one inductance and a switch, which is activated by a digital control device. When the switch is closed, a magnetizing current flows through the inductance. When the switch is open, a demagnetizing current flows through the inductance. The method comprises the steps of measuring the demagnetizing time of the inductance and, when a maximum value of the demagnetizing time of the inductance is exceeded, storing such an occurrence as a fault. The load is disconnected by the control device when a predetermined maximum frequency of faults is exceeded.

12 Claims, 3 Drawing Sheets

Figure 1:
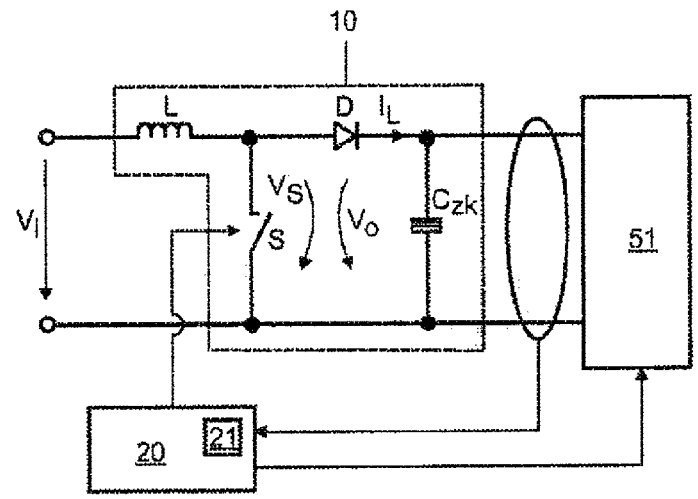

METHOD FOR CONTROLLING A VOLTAGE TRANSFORMER FOR OVERVOLTAGE PROTECTION, VOLTAGE TRANSFORMER AND OPERATING DEVICE HAVING A VOLTAGE TRANSFORMER

RELATED APPLICATIONS

This is a U.S. National Stage of application No. PCT/EP2010/060721, filed on Jul. 23, 2010.

This application claims the priority of German patent application no. 10 2009 036 861.2 filed Aug. 10, 2009, the entire content of which is hereby incorporated by reference.

FIELD OF THE INVENTION

The invention is based on a method for controlling a voltage transformer for operating a switchable load, with at least one inductance and a switch which is controlled by means of a digital control device.

BACKGROUND OF THE INVENTION

In electronic transformers which have an active power factor correction circuit the choice of intermediate circuit voltage is of great significance with regard to functionality and costs. These transformers are usually constructed as simple step-up converters without galvanic isolation (known as flyback topology). They are usually operated at the ripple limit, that is to say between rippled operation and ripple-free operation. There is the problem that, with barely adequate, low-cost component dimensioning, a specific value of the intermediate circuit voltage must not be exceeded, since otherwise components such as the intermediate circuit capacitor may be overloaded and suffer permanent damage. If there is a slightly increased input voltage, the transformer can still keep the intermediate circuit voltage constant by appropriate activation of the switch. If the input voltage increases greatly, for example as a result of a fault in the power supply system, the transformer can no longer correct the intermediate circuit voltage, and the intermediate circuit voltage increases. This puts a load on components such as, for example, the intermediate circuit capacitor. If the electrical transformer is operated with a load that is not continuous over time, the intermediate circuit capacitor is subjected to a voltage and current ripple in addition to the increased intermediate voltage. In many cases, this overloads the component, so that irreversible damage to the component is not ruled out. Therefore, an overvoltage disconnection is often implemented in such transformers. Suitable disconnection criteria allow the component loadings, in particular the current and voltage loading, of the intermediate circuit capacitor under abnormal operating conditions to be reduced. In the case of electrical transformers according to the prior art, the mean value of the intermediate circuit voltage is detected. As already mentioned above, this voltage is of course the output voltage of the electrical transformer. If, as a consequence of an increased input voltage that can no longer be corrected by the electrical transformer, the mean value of this voltage exceeds a value of 109% of the nominal value, the entire device including the load is disconnected. For this purpose, it is necessary that the load is disconnectable. In many applications, such as for example in the case of an electronic operating device for gas discharge lamps, this is no problem, since the transformer is followed by an inverter, which operates the actual load, a gas discharge lamp. This inverter can easily be disconnected in order to protect the entire operating device from the excessive input voltage. Disconnecting the load does not cause any ripple current or ripple voltage, which protects the components of the transformer, in particular the intermediate circuit capacitor. The problem of this known disconnection is that it only takes effect very late, and the components consequently cannot be dimensioned to a desired low value. For example, for applications with the supply voltage customary in Europe of 230 V AC, the known disconnection only takes effect when there is an input AC voltage of 340 V. This represents high loading for many components of the transformer.

SUMMARY OF THE INVENTION

It is an object of the invention to provide a method for controlling a voltage transformer for operating a switchable load, with at least one inductance and a switch which is controlled by means of a digital control device, in which the detection of an excessive input voltage works better. It is another object of the invention to provide a voltage transformer and an operating device with such a voltage transformer that perform the aforementioned method.

This and other objects are achieved according to one aspect of the invention directed to a method for controlling a voltage transformer for operating a switchable load, with at least one inductance and a switch which is activated by means of a digital control device, wherein, when the switch is closed, a magnetizing current flows through the inductance, and when the switch is open, a demagnetizing current flows through the inductance, and the demagnetizing time of the inductance is measured, and the exceeding of a maximum value of the demagnetizing time of the inductance is stored as a fault, wherein the load is disconnected by the control device when a predetermined maximum frequency of faults is exceeded. By this method, early detection of an increased input voltage at which the load is disconnected to protect the voltage transformer is possible. With appropriate parameterization of the fault frequency, disconnection of the load in response to continually recurring excessive voltages that are each of only a short duration, and not harmful to the voltage transformer, is avoided. The faults may in this case be weighted equally, or weighted according to the demagnetizing time. The demagnetizing time is in this case preferably measured by the switch-off time of the switch when operating at the ripple limit. In the case of digital controls, this provides a simple and virtually costless possibility for measurement, since the switch-off time of the switch when operating at the ripple limit is, as a matter of principle, known to the digital control.

In this case, when the output voltage goes below a predetermined voltage limit of the non-operating voltage transformer, the load can also be reconnected. This gives rise to a reversible fault, in the case of which the entire arrangement resumes normal operation when the fault disappears. As a result, the service life can be extended, and operating convenience increases.

The switchable load preferably has an inverter and a gas discharge lamp, wherein the switchable load is disconnected by the operation of the inverter being suspended. Consequently, the entire arrangement corresponds to an electronic operating device for gas discharge lamps that has improved overvoltage protection in comparison with the prior art.

Another aspect of the invention is directed to an electronic operating device having an electronic transformer for operating a switchable load, with at least one inductance and a switch which is activated by means of a digital control device, wherein, when the switch is closed, a magnetizing current flows through the inductance, and, when the switch is open, a demagnetizing current flows through the inductance, and the transformer thereby performs the aforementioned method.

Another aspect of the invention is directed to an electronic transformer for operating a switchable load, with at least one inductance and a switch which is activated by means of a digital control device, wherein, when the switch is closed, a current which magnetizes the inductance flows, and, when the switch is open, a current which demagnetizes the inductance flows, characterized in that the electronic transformer performs the aforementioned method.

The transformer is preferably designed as a power factor correction circuit. The electronic operating device preferably has a gas discharge lamp as a switchable load, wherein an inverter which is activated by the control device, and thereby assumes the switching function, is arranged between the transformer of the electronic operating device and the gas discharge lamp. If the gas discharge lamp is started, the method is preferably not performed.

BRIEF DESCRIPTION OF THE DRAWING(S)

Figure 2:
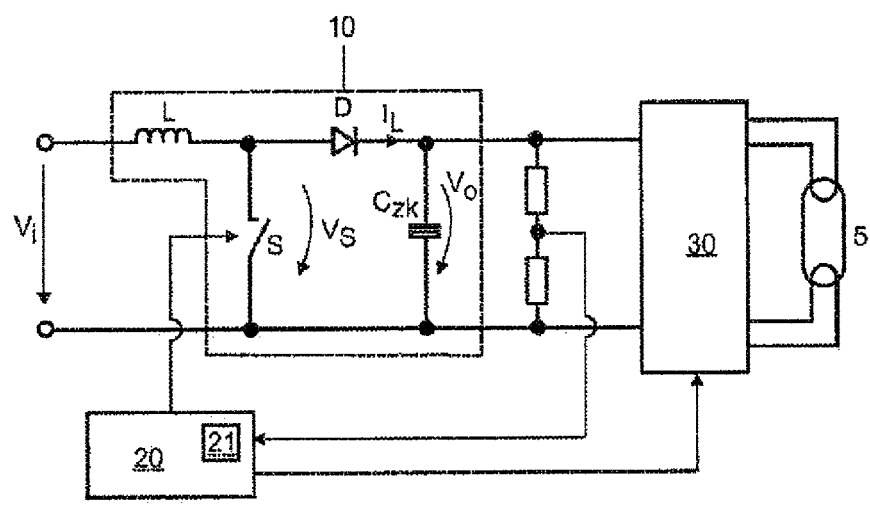
Figure 3:
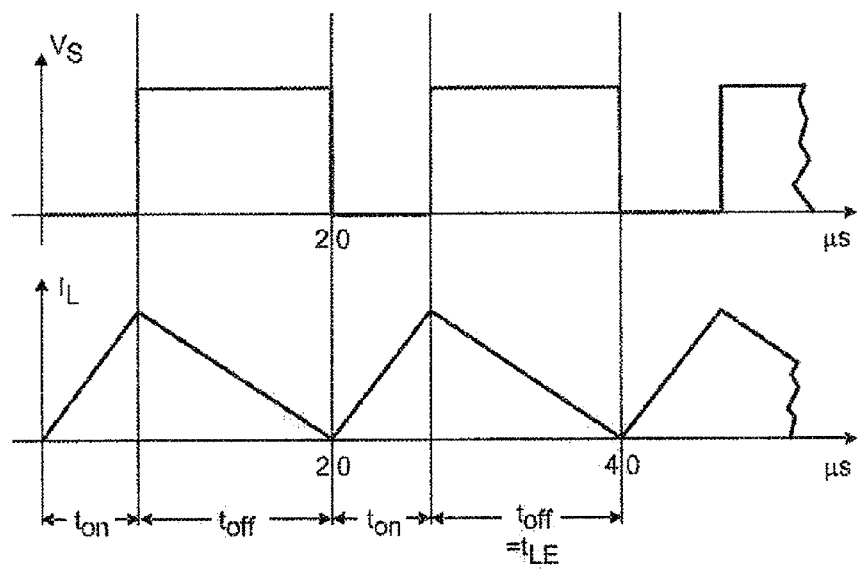
Figure 4A:
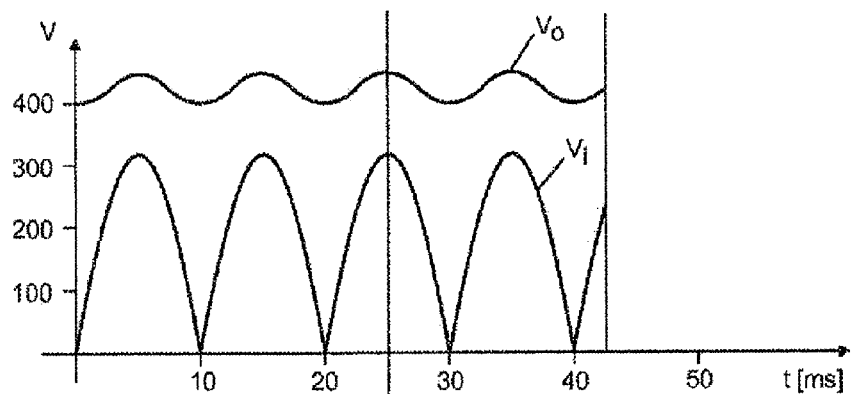
Figure 4B:
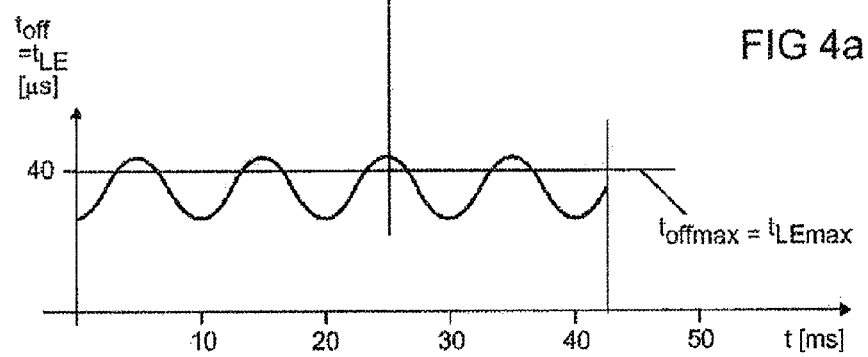
Figure 4C:
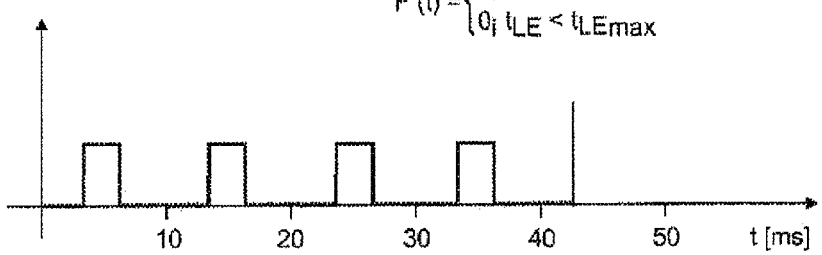

Further advantages, features and details of the invention emerge from the following description of exemplary embodiments and from the drawings, in which elements that are the same or functionally the same are provided with identical designations and in which:

FIG. 1 shows the schematic representation of a voltage transformer which supplies energy to a switchable load and performs the method according to an embodiment of the invention, FIG. 2 shows the schematic representation of the voltage transformer as part of an electronic operating device for operating gas discharge lamps, FIG. 3 shows the inductor current and the switch voltage of the voltage transformer that performs the method according to an embodiment of the invention, FIG. 4a shows the input voltage and the output voltage of the voltage transformer that performs the method according to an embodiment of the invention, FIG. 4b shows the variation of the switch-off time of the switch over time when operating at the ripple limit, FIG. 4c shows the representation of the switch-off function over time in an embodiment of the invention.

PREFERRED EMBODIMENT OF THE INVENTION

FIG. 1 shows the schematic representation of the voltage transformer 10, which supplies energy to a switchable load and performs the method according to the invention. The voltage transformer 10 has the topology of a power factor correction circuit known per se. Connected parallel to the input voltage $V_i$ is the series connection of an inductance L and a switch S. Connected parallel to the switch S is the series connection of a diode D and an intermediate circuit capacitor $C_{ZK}$. The output voltage $V_o$ lies at the intermediate circuit capacitor $C_{ZK}$. The switch S and a switchable load 51 are activated by a control device 20 in accordance with the method according to the invention. The control device 20 receives as an input variable the output voltage $V_o$ of the voltage transformer 10, which at the same time represents the intermediate circuit voltage. The control device 20 has a memory 21, in which, in accordance with the method according to the invention, a fault is stored on the basis of a demagnetizing time of the inductance L. In this case, not only the number of faults is stored in the memory 21, but also their occurrence in time, in order that it is possible in the method according to the invention
to calculate later a frequency of the occurrence of the faults.

FIG. 2 shows the schematic representation of the voltage transformer as part of an electronic operating device for operating gas discharge lamps. Again, the power factor correction circuit 10 already described above is used as the voltage transformer. The control device 20 obtains the output voltage signal of the power factor correction circuit 10 via a voltage divider. Provided here as the switchable load 51 is an inverter 30, which operates a gas discharge lamp 5. A low-pressure gas discharge lamp is indicated here in a stylized form, but it may equally well be a high-pressure discharge lamp or module comprising one or more semiconductor light sources that is operated by the method according to the invention. The inverter is constructed in the customary way, i.e. a half-bridge inverter or full-bridge inverter may be used, for example. Similarly, however, it is also conceivable to use a single-ended converter, such as for example a Class E converter.

As FIGS. 1 and 2 reveal, the power factor correction circuit has no input voltage measurement. This is only reluctantly implemented for various reasons. On the one hand, the measurement of a further measured variable involves effort, and consequently costs. On the other hand, in many countries there are strict standards for switching parts that are connected to the supply voltage, which further increases the effort and costs involved in measuring this voltage. The power factor correction circuit therefore cannot measure the size of the input voltage directly, but only determinate it indirectly. As already described above, the method used so far, mentioned at the beginning, is too inaccurate to allow the switchable load to be disconnected when there is a low maximum input voltage.

According to the invention, the demagnetizing time of the inductance L, which corresponds to the switch-off time of the switch S when
operating at the ripple limit, is used for detecting the size of the input voltage. The demagnetizing time is the time in which the current flowing through the inductance L falls from a maximum value to zero within a cycle. The inductance L is also referred to hereafter as an inductor L. The feedback-corrected switch-off time of the switch S, which is equal to the demagnetizing time when operating at the ripple limit, is in the case of a step-up converter a measure of the difference between the momentary input voltage and the output voltage.

This interrelationship is now described on the basis of FIG. 3. The upper curve in FIG. 3 shows the voltage $V_s$ across the switch S, the lower curve shows the transformer current $I_L$, which flows through the diode D and through the inductor L. The triangular current profile is typical of inductor transformers, in which the energy is transferred by the charging and discharging of an inductor. During rippled operation or when operating at the ripple limit, the current through the inductor L always goes down to zero. As can be seen from the two curves, the switch S is switched on when the current is increasing, and the inductor is being charged. During this time, the voltage across the switch S is zero. During the switch-off phase, a voltage that corresponds to the input voltage after the inductor L lies across the switch. In this time, the current through the inductor L falls again, until after approximately 20 µs it approaches zero. The switch-on time of the transistor is always of approximately the same length here. Consequently, the peak value of the inductor current follows the input voltage, and the transformer assumes the characteristics of a power factor correction circuit. The on time is prescribed by the control system. It is constant over the supply modulation and depends on the system power. The discharge time of the inductor, which when operating at the ripple limit can be equated with the switch-off time of the switch S, varies however according to the quotient of the input voltage and the difference between the output voltage and the input voltage. Mathematically, the following equation can consequently be formulated: ######; $t_{on}$ is in this case regarded as approximately constant, as described above.

FIG. 4 then shows several graphs, which are intended to be used as a basis for illustrating the method according to the invention. FIG. 4a shows the input voltage $V_i$ and the output voltage $V_o$ of the voltage transformer that performs the method according to the invention. The input voltage $V_i$ has the typical rectified 100 Hz sine waveform, as occurs in European supply systems. The output voltage $V_o$ is higher overall than the input voltage $V_i$, since the power factor correction circuit is of course a step-up converter, the output voltage $V_o$ of which is always greater than the input voltage $V_i$. For example, the mean value of the output voltage $V_o$ lies at 420 V. If the input voltage $V_i$ is too great, thus the peak value of the input voltage $V_i$ is above 320 V, the switch-off time $t_{off}$ of the switch S at the supply voltage peak also increases correspondingly. FIG. 4b shows the variation of the switch-off time $t_{off}$ of the switch over time when operating at the ripple limit of the voltage transformer 10. As a result of the same time resolution of the graphs lying one below the other, it can be seen well that the switch-off time $t_{off}$ always reaches its maximum when the difference between the input voltage $V_i$ and the output voltage $V_o$ is at the highest, that is to say always close to the supply peak. If the supply voltage is too high, the switch-off time $t_{off}$ also reaches values that lie above those during normal operation. Since the switch-off time $t_{off}$ is known to the control device 20, it can monitor this time with respect to exceeding a predetermined maximum value and, if it does exceed it, according to the invention store a fault in the memory 21. The memory 21 is in this case preferably a component part of the control device 20. It goes without saying that it is also possible equally well for the discharge time, i.e. the demagnetizing time $T_{LE}$, of the inductor, which in the case of operation at the ripple limit corresponds to the switch-off time $t_{off}$ of the switch S, to be measured directly. If the transformer is not a power factor correction circuit and is operated with rippled current, the switch-off time of the switch S can no longer be used, but instead the discharge time, i.e. the demagnetizing time $t_{LE}$ of the inductor L, must be measured directly. Along with a fault, a time stamp may also be stored. The time stamp provides information on when exactly the fault occurred.

The predetermined maximum value of the switch-off time $t_{offMax}$, which corresponds to the predetermined maximum value of the demagnetizing time $t_{LEmax}$, is indicated in FIG. 4b by a horizontal line, and in the present exemplary embodiment is 40 µs. Therefore, as soon as the switch-off time $t_{off}=t_{LE}$ becomes greater than 40 µs when operating at the ripple limit, a fault is stored. For the sake of simpler processing, a function which mathematically replicates this situation is used for this purpose. This is referred to hereafter as the switch-off function F(t). In the simplest case, this is 1 when the predetermined maximum value $t_{LEmax}$ (=$t_{offMax}$ when operating at the ripple limit) has been exceeded, and there is consequently a fault, and 0 when this is not the case: #####. This function is represented over time in FIG. 4c. From this function, various algorithms can then be developed to handle the stored faults. In the simplest case of a first embodiment, the fault frequency within a specific time period is measured. If the fault frequency is greater than a predetermined value, the control device 20 disconnects the inverter 30, and consequently the gas discharge lamp 5. The fault frequency is hereafter the frequency of the faults defined by a cumulative number of faults within a predetermined time period.

If the input voltage is too high, the fault frequency increases until either the device is disconnected or, in the case of an only brief increase, the fault frequency slowly falls again. Consequently, the electronic operating device does not permanently register the brief increase in the input voltage $V_i$, and quickly resumes normal operation. Depending on the length of the time period within which the fault frequency is measured, a more intolerant disconnection mimic or more tolerant behavior can be achieved. The shorter the time period that is considered, the more intolerant the disconnection behavior is. The greater the time period that is considered, the less severe the threshold at which the inverter 30 is disconnected. The device is only disconnected when there is a sustained overvoltage. In this variant, the control device 20 can of course continue operating after the disconnection and monitor the output voltage of the DC converter, in order to be able to reconnect the device when required. However, this can no longer be assessed on the basis of the demagnetizing time $t_{LE}$ of the inductor L. With the load disconnected, the control device 20 disconnects the DC converter, so that it is no longer operating. Then, on account of the fixed current path, the output voltage $V_o$ of the transformer is substantially the same as the peak value of the input voltage $V_i$ (peak value rectification when there is no load current). Therefore, the input voltage $V_i$ may in this case be measured more or less directly by way of the output voltage $V_o$. If the input voltage $V_i$ falls again below a predetermined lower input voltage value, the control device 20 may reconnect the load, that is to say put the inverter 30, and consequently the gas discharge lamp 5, back in operation.

In a further embodiment of the method according to the invention, the switch-off function F(t) may also have two or more values, which are generated by two or more thresholds of the demagnetizing time $T_{LE}$ (corresponding to the switch-off time $t_{off}$ of the switch S when operating at the ripple limit): #####. Here there are two thresholds, $t_{LE1max}$ and $t_{LE2max}$ where $t_{LE2max}$ is greater than $t_{LE1max}$. A finer setting of the disconnection can be achieved thereby, since the memory 21 can also store 'major faults' when there are higher input voltages and correspondingly 'more minor faults' when there are only slightly increased input voltages. $t_{LE1max}$ may, for example, be 40 µs here, and $t_{LE2max}$ 45 µs. Consequently, the individual accumulated faults are weighted, and the disconnection can be even more finely adjusted.

The faults may also be written to a memory, wherein the memory 21 is incremented by one during the considered time period in the case of a minor fault and incremented by two during a major fault. If in this time period the memory content of the memory 21 exceeds a predetermined value, the inverter 30 is disconnected. After this time period has elapsed, the memory is reset to 0, and the measurement can begin anew.

However, it is also possible to implement what is known as a 'FILO' memory, by means of which a sliding measuring period can be realized. FILO stands for first in, last out. Consequently, only the faults that have a time stamp within the considered time period are considered. Each fault is assigned the time of the occurrence of the fault. If the point in time at which the fault occurred lies within the time period, the fault is counted in the fault memory, if it lies outside this time period it is erased from the memory 21, i.e. the memory 21 is in turn decremented by this value. Consequently, an assessment of the input voltage that is continuous over time is possible, thereby increasing operational reliability. The time period always moves along with the current time, that is to say for example a time period which stops at the current point in time and begins at a point in time that lies before the current time by a predetermined value is considered. The time period is therefore calculated as: current point in time—predetermined time period. This time period consequently always run simultaneously with the current time, so that a sliding assessment is made possible.

Of course, the values of the switch-off function F(t) are not limited to 0, 1 and 2. Depending on the design and the Memory, the values can be adapted to the application. It is conceivable here for the memory to be fed both negative numbers (1; 0; −1) and likewise asymmetric variants (for example 32, 8, −4).

If negative numbers are used, in a normal case the fault memory is decremented, until during normal operation it reaches the value 0. This means that there is no fault, since the memory 21 cannot become less than zero. In the case of a fault, however, the memory 21 is incremented by a greater value, so that, as from a certain fault frequency, the content of the memory increases. The preferred predetermined maximum frequency of the faults here is, for example, 10%, i.e. if, in the considered time period, more than 10% of the measured demagnetizing times $t_{LE}$ lie above the predetermined maximum value of the demagnetizing time $t_{LEmax}$, the inverter, and consequently the gas discharge lamp 5, is disconnected as the load. This means that, in a simple case of a single fault threshold (i.e. just a predetermined maximum value of the demagnetizing time $t_{LEmax}$), the switch-off function is defined as: #####; consequently, as from a fault frequency of >10%, the stored value of the memory 21 increases and, as from a predetermined value of the fault memory, the gas discharge lamp 5 may be disconnected by means of the inverter 30. The tolerance threshold of the arrangement can still be finely adjusted by way of the size of the predetermined value of the fault memory.

Of course, the switch-off function may also have more thresholds, and consequently more possible values, if this is appropriate, and thus called for, on account of the application. High operational reliability is ensured by the combination of a changing of the memory 21 according to the input voltage and the residence time of the memory contents according to the time period. This allows the method according to the invention to be adapted to a wide variety of boundary conditions, and thus the desired manner of behavior to be presented.

The invention claimed is:

1. A method for controlling a voltage transformer for operating a switchable load having at least one inductance and a switch, which is activated by a digital control device, wherein when the switch is closed, a magnetizing current flows through the inductance, and when the switch is open, a demagnetizing current flows through the inductance, wherein the method comprises the steps of:
   measuring the demagnetizing time of the inductance;
   when a maximum value of the demagnetizing time of the inductance is exceeded, storing such an occurrence as a fault; and
   disconnecting the load by the control device when a predetermined maximum frequency of faults is exceeded.

2. The method as claimed in claim 1, wherein the frequency of the faults is defined by a cumulative number of faults within a predetermined time period.

3. The method as claimed in claim 2, wherein the individual faults are each weighted equally.

4. The method as claimed in claim 2, wherein the individual faults are weighted according to the demagnetizing time of the inductance.

5. The method as claimed in claim 2, wherein the predetermined time period is relative to a current time.

6. The method as claimed in claim 1, wherein the demagnetizing time is measured by determining the switch-off time of the switch when operating at a ripple limit.

7. The method as claimed in claim 1, wherein, when an output voltage goes below a predetermined transformer output voltage, the load can be reconnected.

8. The method as claimed in claim 1, wherein the switchable load has an inverter, which is activated by the control device, and a gas discharge lamp, wherein the switchable load is disconnected by the operation of the inverter being suspended.

9. An electronic transformer for operating a switchable load comprising:
   at least one inductance; and
   a switch, which is activated by a digital control device,
   wherein when the switch is closed, a current which magnetizes the inductance flows, and
   wherein when the switch is open, a current which demagnetizes the inductance flows, and
   wherein the electronic transformer performs a method as claimed in claim 1.

10. The electronic transformer as claimed in claim 9, wherein the transformer is configured as a power factor correction circuit.

11. An electronic operating device for operating a gas discharge lamp, comprising an electronic transformer as claimed in claim 9, wherein the load is the gas discharge lamp.

12. The electronic operating device as claimed in claim 11, further comprising an inverter, which is configured for switching the gas discharge lamp on and off.

* * * * *